July 21, 1953
W. WAGNER
2,646,071
MAGNETIC CHECK VALVE
Filed Dec. 29, 1948
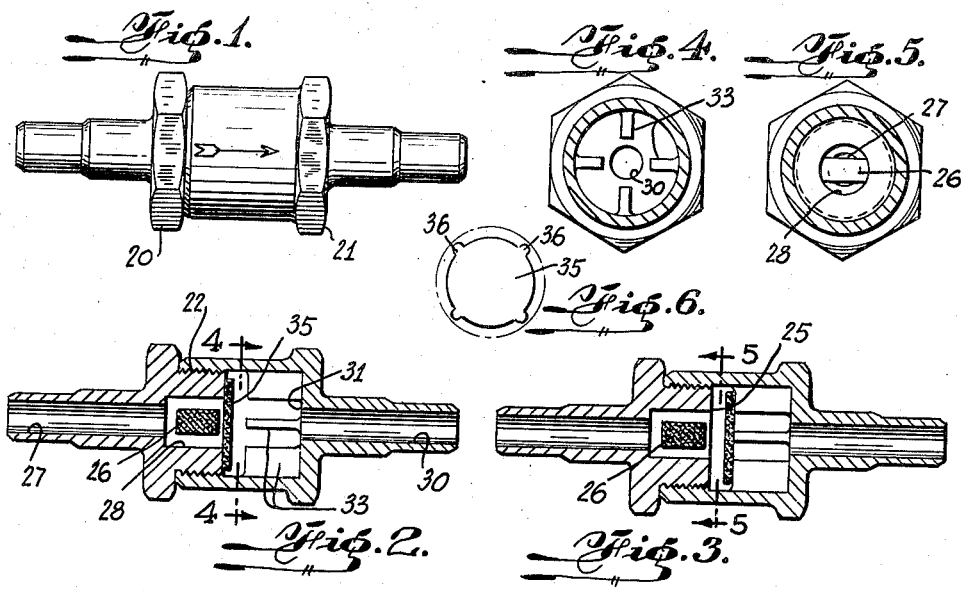
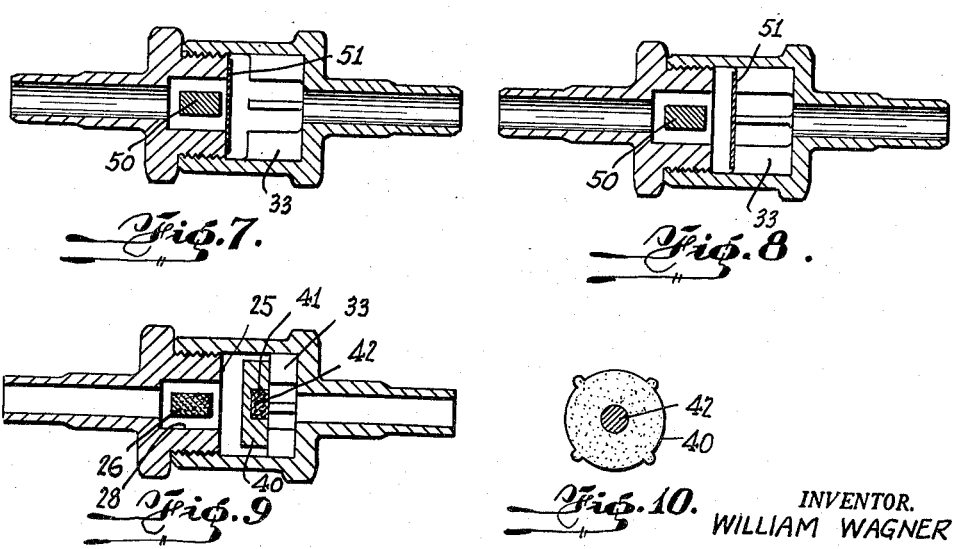
INVENTOR.
WILLIAM WAGNER.
BY
*Samuel J. Stoel*
ATTORNEY.

Patented July 21, 1953

2,646,071

UNITED STATES PATENT OFFICE 2,646,071

MAGNETIC CHECK VALVE

William Wagner, New York, N. Y.

Application December 29, 1948, Serial No. 67,817

4 Claims. (Cl. 137—528)

This invention relates to a magnetic check valve.

The valve herein described and claimed is designed primarily for use in refrigeration systems but its use is obviously not limited to such systems. In refrigeration systems, the refrigerant may produce a corrosive effect upon materials which are generally found in conventional disc-type check valves. Especially is this true of magnetic check valves since some refrigerants appear to attack ferrous metals. In the present invention, however, magnetic materials are used which are resistant to chemical reaction with all known refrigerants which applicant has tested. These materials have not heretofore been used in check valves and, indeed, the normal requirements of check valve construction would seem to militate against their use.

It is accordingly the principal object of this invention to provide a magnetic check valve in which nonferrous magnetic materials are used to produce the necessary magnetic effect. These materials are plastic materials and preferably they take the form of thermo-setting plastics. Although thermo-plastic plastics may also be used in this connection, it is best to use thermo-setting plastics when high temperatures are likely to be encountered.

Another object of this invention is the provision of a magnetic check valve of the character described, in which the valve seat is non-magnetic, the magnet being provided centrally of the seat. Its polarity should be such as to attract the disc which constitutes the valve proper.

Among the advantages of the present invention, the following may be noted: The use of plastic material having magnetic properties enables the valve to be employed in connection with fluids which would normally react with ferrous metals. It has not heretofore been thought that magnetic properties could be incorporated into plastic materials nor has it heretofore been thought that such plastic materials could be made sufficiently smooth and uniform to be used as valve seats or the valve discs for such seats. The use of a magnet which is centrally located relative to the valve seat enables the valve structure herein claimed to be employed in connection with fluids in which particles of metal such as would be attracted by magnets are found. Heretofore the seats of magnetic check valves have been provided with magnetic properties. Hence, the seats would tend to attract the metal particles in the fluid which flows through the valve, thereby preventing fluid-tight contact between the valve disc and the valve seat. Hence the check valve of the present invention may be employed in systems where metallic particles which would normally be attracted by magnetism may be encountered. Another substantial advantage which is inherent in the present construction lies in the fact that the magnetic force which attracts the valve disc may be increased or decreased as desired, by simply providing a longer or a shorter magnet opposite the valve disc. The limitations which are necessarily imposed when the valve seat is itself magnetic are here absent since the valve may accommodate relatively long as well as relatively short magnets centrally of the valve seat.

Although the present invention relates primarily to magnetic valves in which plastics with magnetic properties are incorporated, some of the aspects of the invention are equally applicable to check valves in which conventional magnetic materials are used.

Preferred forms of this invention are shown by way of illustration in the accompanying drawing in which:

Fig. 1 is a plan view of a check valve made in accordance with the present invention, an arrow on said valve showing the normal direction of flow therethrough;

Fig. 2 is a longitudinal section therethrough, showing the valve disc in closed position, the magnet being shown disposed centrally of the valve seat and both the magnet and the valve disc being made of plastic materials having magnetic properties;

Fig. 3 is a similar view showing the valve disc in open position;

Fig. 5 is a transverse section on the line 4—4 of Fig. 2 showing the stop members which stop the valve disc in its movement away from the valve seat;

Fig. 5 is a transverse section on the line 5—5 of Fig. 3 showing how the magnet which is disposed centrally of the valve seat is fixed in the valve passageway;

Fig. 6 is a plan view of the valve disc;

Fig. 7 is a view similar to that of Fig. 2 of a third form of this invention, this third form being similar to the first form with the sole exception that both the magnet and the valve disc are made of conventional ferrous materials;

Fig. 8 is a similar view of the same valve showing the valve disc in open position;

Fig. 9 is a sectional view, longitudinally of the valve, showing another form of valve disc, which is partly magnetic and partly nonmagnetic; and Fig. 10 is face view thereof.

Referring now to the first six figures of the drawing, it will be seen that the valve herein claimed includes a male part 20 and a female part 21 which are joined to each other by means of screwthreads 22. The male part 20 is provided with seat 25 and with magnet 26. It will be noted that the passageway 27 through the male part of the valve is enlarged adjacent the seat to form a chamber 28 in which the magnet is disposed. It will be seen in Fig. 5 that the magnet extends fully from one side of the chamber to the other and that a press fit holds the magnet in said chamber. The chamber, however, is cylindrical in shape and the magnet is non-cylindrical in shape and hence space is provided between the sides of the magnet and the chamber wall. The cross sectional area of this space is at least equal to the cross section area of passageway 27 so that although the magnet actually occupies a central position in the valve, it does not in any substatntial manner obstruct the flow of the fluid through the valve.

Passageway 30 of the female part of the valve corresponds to passageway 27 of the male part. Passageway 30 is enlarged to form a chamber 31 corresponding to chamber 28 of the male part of the valve. Formed in said chamber 31 is a plurality of radial flanges or vanes 33 which serve as stop members for valve disc 35, also disposed in said chamber 31. This valve disc is movable from its open position against vanes 33 as shown in Fig. 3, to its closed position against seat 25 as shown in Fig. 2. The magnetic attraction of magnet 26 attracts the disc from its open to its closed position and the flow of the fluid through the valve in the direction of the arrow of Fig. 1 compels the disc to move in the opposite direction, that is, from its closed to its open position.

It will be noted that the valve seat is integral with the male part of the valve. In its preferred form, the male part of the valve, as well as the female part, are made of a nonferrous material such as brass. This material is completely devoid of magnetic properties and hence it does not and cannot attract metallic particles which would interfere with the proper closing of the valve disc against the valve seat.

The valve disc 35 may or may not constitute a magnet. It is sufficient for this disc to be subject to attraction by magnet 26. It is provided with spaced ears 36 on its peripheral edge to space its said peripheral edge from the wall of chamber 31 and also to centralize its movement toward and away from seat 25. When it is desired, however, to make use of a valve disc which does possess magnetic properties, the problem arises as to the attraction by said disc of particles of ferrous metals which would have the effect of preventing a tight closure between said disc and a valve seat. It may accordingly be necessary, in order to mitigate this condition, to provide the said type of valve disc which is shown in Figs. 9 and 10 of the drawing. The valve disc 40 shown in Figs. 9 and 10 has a centrally extending recess 41 formed therein and a disc or cylindrically shaped magnetic member 42 press-fitted therein. Disc 40 is non-magnetic and hence it does not attract metallic particles. Magnetic member 42 may attract such particles but it will be noted in Fig. 11 that this magnetic member is so disposed in disc 40 that it registers with chamber 28. Nowhere does it overlap seat 25. Hence such metallic particles as it may attract will collect, for the most part, centrally of disc 40 and not in the area of contact between said disc and seat 25. In this connection it should be pointed out that magnet 26 is set back in chamber 28 to such extent that a substantial space is left between it and the transverse plane on which the seat is disposed. Hence, the accumulated particles either on the magnet itself or on the centermost portion of disc 40 will in no wise be able to prevent a tight closure between the disc and the seat.

In the form of invention shown in the first six figures of the drawing both the magnet and the disc are made of plastic materials. In the form of invention shown in Figs. 7 and 8, the magnet and disc are made of conventional materials, that is, ferrous materials. In all other substantial respects, the two forms of his invention last above mentioned may be identical. On the assumption that the valve of Figs. 7 and 8 will be used in a system in which ferrous metals are not attacked chemically, it will be understood that the magnet 50 of said valve may comprise a conventional magnet, preference being given to the steel or iron alloy type such as the aluminum-nickel-cobalt-iron alloy which is commonly known under the name of Alnico. Other suitable magnetic materials may comprise steel alloyed with tungsten, chromium and manganese. Molybdenum may be used instead of tungsten where desired. It is important to note too, that non-ferrous metals may be used in this connection where ferrous metals are undesirable for one reason or another. A non-ferrous magnet alloy which may find considerable use in check valves of the character described contains 41% of cobalt, 24% of nickel and 35% of copper. Valve disc 51 which is attracted by magnet 50 need not constitute a magnet. It is sufficient if it is attractable by a magnet and it may be made of any desired grade and character of steel or steel alloy. Corrosive resistant steel, commonly known as stainless steel, may be used for this purpose.

It will be appreciated that the foregoing is descriptive of preferred forms of this invention and that other forms and modifications of these forms may be had within the broad scope of the invention.

I claim:

1. A magnetic check valve comprising a pair of valve housing members in screw threaded engagement with each other and forming a valve chamber therebetween, an inlet port formed in one of said housing members and communicating with said valve chamber to permit a flow of fluid through said inlet port and into said valve chamber, an outlet port formed in the other housing member and also communicating with said valve chamber to permit a flow of fluid out of said valve chamber through said outlet port, a magnet fixedly mounted in said inlet port, the cross-sectional area of said magnet being smaller than the cross-sectional area of the inlet port to provide a passageway through said inlet port and into said valve chamber, past said magnet, a non-magnetic valve seat formed on the housing member in which the inlet port is formed, said valve seat being ring-shaped and encircling said inlet port, and a disc-shaped, magnetically responsive valve member movably mounted in said valve chamber for movement into engagement with the valve seat in response to the attraction of said magnet thereon to close the inlet port, and for movement out of engagement with the valve seat, under the influence of a flow of fluid from the inlet port and against the attraction of the magnet, to open said inlet port.

2. A magnetic check valve in accordance with claim 1 wherein the disc-shaped valve member is provided with ears along its peripheral edge to space its said peripheral edge from the wall of the valve chamber to permit a passage of fluid between said valve member and the wall of the valve chamber when said valve member is out of engagement with the valve seat and the inlet port is open.

3. A magnetic check valve in accordance with claim 1, wherein stop means is provided in the valve chamber at the outlet port to engage the valve member when it is unseated from the valve seat under the influence of the flow of fluid from the inlet port and thereby to prevent the valve member from being thrust against the outlet port.

4. A magnetic check valve in accordance with claim 1, wherein the magnet is situated a spaced distance behind the valve seat to prevent contact with the disc-shaped magnetically responsive valve member when the latter is attracted by said magnet into engagement with the valve seat to close the inlet port.

WILLIAM WAGNER.

References Cited in the file of this patent

UNITED STATES PATENTS

| Number | Name | Date |
|---|---|---|
| 22,952 | Hopkins | Feb. 15, 1859 |
| 912,576 | Kelley | Feb. 16, 1909 |
| 1,355,230 | Kaiser | Oct. 12, 1920 |
| 1,476,383 | Twardowsky | Dec. 4, 1923 |
| 1,890,513 | Kessler | Dec. 13, 1932 |
| 2,199,526 | McCowen | May 7, 1940 |
| 2,238,893 | Fischer | Apr. 22, 1941 |
| 2,502,525 | Krugler | Apr. 4, 1950 |
| 2,569,316 | Jerman | Sept. 25, 1951 |
| 2,597,952 | Rosenlund | May 27, 1952 |

FOREIGN PATENTS

| Number | Country | Date |
|---|---|---|
| 74,521 | Austria | Aug. 26, 1918 |
| 212,570 | Germany | Aug. 5, 1909 |
| 2,242,555 | Curtis | July 29, 1947 |